United States Patent [19]

Chandler et al.

[11] 4,210,211

[45] Jul. 1, 1980

[54] TURNROW PLOW

[76] Inventors: Mikel G. Chandler; Von Chandler, both of P.O. Box 550, Tahoka, Tex. 79373

[21] Appl. No.: 914,538

[22] Filed: Jun. 12, 1978

[51] Int. Cl.² ..................... A01B 35/14; A01B 63/102
[52] U.S. Cl. ..................................... 172/451; 172/698
[58] Field of Search ................... 172/19, 20, 192, 195, 172/451, 690, 698, 720, 722, 724, 730, 733

[56] References Cited

U.S. PATENT DOCUMENTS

| | | | |
|---|---|---|---|
| 3,022,836 | 2/1962 | Bechman | 172/698 |
| 3,048,229 | 8/1962 | Simpson | 172/698 |
| 3,160,215 | 12/1964 | Harrell | 172/698 X |
| 4,010,805 | 3/1977 | Kelley | 172/698 |
| 4,095,653 | 6/1978 | Van der Lely | 172/451 X |

FOREIGN PATENT DOCUMENTS

| | | | |
|---|---|---|---|
| 52356 | 2/1912 | Austria | 172/698 |
| 324963 | 2/1972 | U.S.S.R. | 172/192 |

*Primary Examiner*—Richard T. Stouffer
*Attorney, Agent, or Firm*—Wendell Coffee

[57] ABSTRACT

A plow includes a single horizontal blade adapted to plow deep below the earth to cultivate turnrows or other strips of a field having no crop growing thereon. The blade has about a 12° plow angle and is V-shaped with a 25° drag angle sweeping back on either side of the medial apex.

3 Claims, 6 Drawing Figures

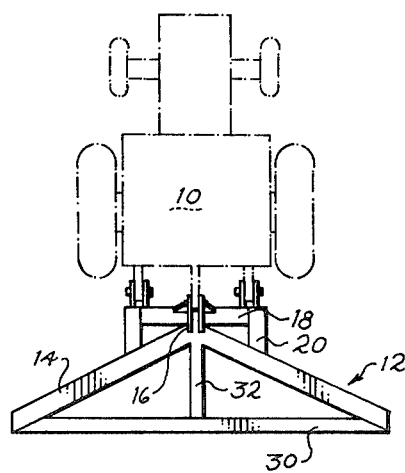
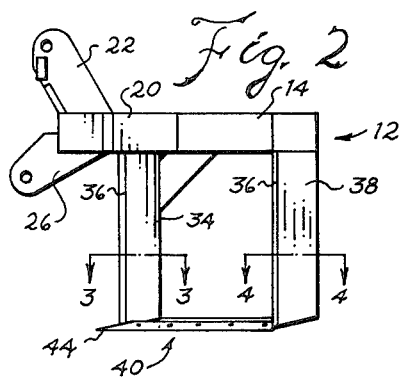
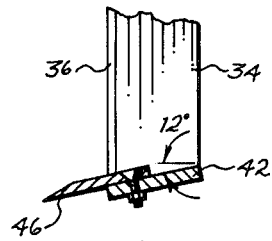
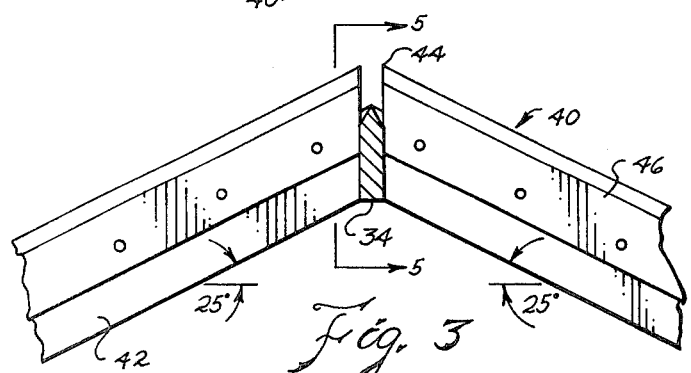
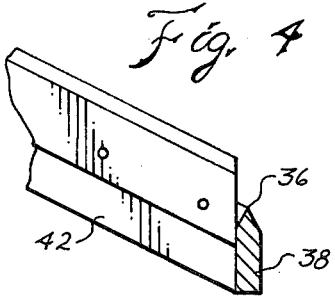
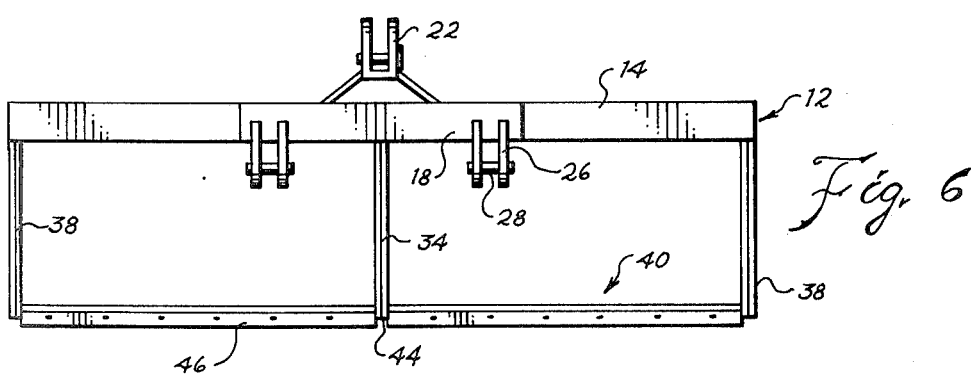

TURNROW PLOW

BACKGROUND OF THE INVENTION (1) Field of the Invention

This invention relates to earthworking equipment and more particularly to a plow having a horizontal blade which runs beneath the earth.

(2) Description of the Prior Art

Commercially on the market, before our invention, others had manufactured turnrow plows having a single horizontal blade which ran beneath the surface of the earth. Prior to our invention, they normally used a single straight blade which was normal to the direction of draft. Normally, the blade had little plow angle, i.e., the blade had no draft from front to rear so that it was necessary to force it into the ground by applying weight thereto.

Before this application was filed, a search was made in the United States Patent and Trademark Office and the following patents were found.

Rodger U.S. Pat. No. 7,463
Dycus U.S. Pat. No. 577,946
Moyer et al. U.S. Pat. No. 1,645,507
Junor et al. U.S. Pat. No. 1,942,708
Ranney U.S. Pat. No. 2,327,930
Provost U.S. Pat. No. 2,617,347
Harrell U.S. Pat. No. 3,160,215
Taylor U.S. Pat. No. 3,581,685

It would appear from these prior patents that none of them show the combination of elements of this invention. However, certain particular similarities might be pointed out in some of them. Rodger shows a V-shaped weeder, there is some indication that it is supported by shanks having sharpened knifed edges.

Ranney discloses a sod cutter having a separate moldboard and plowshare.

Junor et al. shows a blade with a plow angle.

The other patents do not appear to be any more pertinent than the three discussed above.

SUMMARY OF THE INVENTION (1) New and Different Function

We have invented an improved plow particularly adapted to cultivate turnrows and unplanted strips of land. Our invention is particularly adapted for semi-arid land. I.e., by running the plow deep within the ground and by having a horizontal blade run deep within the ground, the soil is not turned over. This is desirable in such situations because turning over the soil results in a greater loss of moisture than if the weeds can be killed without turning. We have discovered that if a V-shaped blade is used, i.e., one which sweeps back from the front, that debris is less likely to hang upon the plow than if its cutting edge extends straight across or normal to the direction of draft. Also, it is desirable to have a plow angle so that the plow pulls down into the earth rather than depending upon weight to force the blade into the earth.

More particularly, we have discovered that for successful operation it is necessary to have an extremely sturdy frame supporting the blade. This is accomplished by having a frame which is substantially the shape of the blade, i.e., a V-shape, so that the shanks which support the plow extend vertically down from the frame. With the V-shape frame, a back member extends normal to the direction of draft to close the wings of the frame to reinforce it. Also, a hitch bar is at the front of the frame which is less than the width of the plow which is also is normal to the direction of draft to which a three-point hitch is attached.

Therefore, it may be seen that the total function of all the parts is far greater than the sum of the functions of the individual shanks, knife edges, plowshares, bars, beams, etc.

(2) Objects of this Invention

An object of this invention is to cultivate the soil.

Another object of this invention is to cultivate turnrows and other strips which do not have growing crops thereon.

Further objects are to achieve the above with a device that is sturdy, compact, durable, simple, safe, efficient, versatile, ecologically compatible, energy conserving, and reliable, yet inexpensive and easy to manufacture, attach, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a top plan view of an embodiment of this invention attached to a farm tractor which is shown in phantom lines.

FIG. 2 is a side elevational view of the invention.

FIG. 3 is a sectional plan view of the apex of the blade and apex shank, taken substantially on line 3—3 of FIG. 2.

FIG. 4 is a plan sectional view taken substantially on line 4—4 of FIG. 2 showing a wing shank.

FIG. 5 is a sectional view taken substantially on line 5—5 of FIG. 3 showing the blade construction.

FIG. 6 is a front elevational view.

DESCRIPTION OF THE PREFERRED EMBODIMENT

Referring to the drawing, it may be seen that a turnrow plow is adapted to be drawn by farm tractor 10. A farm tractor, customarily, has three bars extending rearwardly for connection of farm implements.

The frame 12 includes V-shaped frame member 14. The V-shaped frame member 14 is made of particularly heavy structural members. For this, we prefer to use rectangular tubing measuring 4"×7"×⅜" wall thickness. The frame member 14 has apex 16 in the front. Hitch beam 18 is securely attached by a welded joint at the apex 16. It is normal to the direction of draft. In addition to the hitch beam being attached to the V-shaped frame member, the hitch beam 18 is also attached by struts 20 which extend from the end of the hitch beam back to the V-shaped frame member 14. The struts 20 are aligned in the direction of draft.

A pair of upstanding arms 22 extend upward from the center of the hitch beam, i.e., at the apex 16. A pin extends between the top of the two arms 22. This forms the center point of the three-point hitch by which the frame is attached to the farm tractor. The arms are braced to the hitch beam by suitable bracing.

At each end of the hitch beam, aligned with the strut 20, a pair of arms 26 extends downward. Each pair of the arms 26 has a horn 28. This is to attach onto the outer of the beams extending backward from the farm tractor, thus forming the three-point hitch.

Back member 30 is attached to the outer ends of the V-shaped frame member 14 thus forming a triangle by members 14 and 30. A center strut 32, aligned with the direction of draft, extends from the apex 16 to the back member 30.

Apex shank 34 extends vertically downward from the apex 16. It is securely welded thereto and has the wider side aligned with the direction of draft as seen in the drawing. The forward edge of the apex shank is beveled to knife edge 36. Wing shanks 38 extend from the tips of the wings of the V-shaped member 14 vertically downward. The wing shanks also have forward knife edges 36. We have found that using shanks having a depth nearly equal to the width of the rectangular tubing is desirable. Specifically, we have found that using shanks which are 6 inches deep, 1 inch thick and 24 inches in height operates well. Therefore, it may be seen since they are six inches in depth that they extend nearly the full width of the V-shaped frame member which is 7 inches.

The bottom of each of the shanks is welded to V-shaped blade 40. The blade 40 is immediately below the V-shaped frame member 14. The blade 40, therefore, will sweep back at an angle of 25° from its apex 44. The V-shaped blade itself is a composite structure having moldboard 42 made for the main structural support. The moldboard has a width equal to the depth of the shank, i.e., six inches. However, it has a thickness of half as much as the shank, i.e., $\frac{1}{2}$ inch. We have found that having a moldboard length of 55 inches is desirable. We have found it desirable that the blade sweep back from its apex 44 which is immediately below the apex of the frame member 16 and is the point to which the apex shank 34 is welded. With each of the moldboards or wings angled back at the angle of 25° that the measurement from the outside of the outside of one wing shank 38 to the outside of the other wing shank 38 will be 103 inches.

Plowshare 46 or cutting edge or blade is bolted to the top front of the moldboard 42. We have had good success using a high carbon steel blade for the purpose of making the plowshare 46. We have had good success of using blades which are originally manufactured to be grader blades, i.e., to be used as the blades of road maintainers. The bolting of the plowshare 46 to the moldboard 42 is by plow bolts as will be understood by those having ordinary skill in earthworking equipment.

The bottom of the shanks 34 and 38 are angled so that the blade 40 has a plow angle from front to back of 12° as seen in FIG. 5.

As may be seen the turnrow plow will be wider than the farm tractor 10.

The dimensions have all been given in the English system of inches. The metric equivalent of these measurements is as follows:

| | | |
|---|---|---|
| $\frac{3}{8}"$ | = | 10mm |
| $\frac{1}{2}"$ | = | 13mm |
| 1" | = | 25mm |
| 4" | = | 10cm |
| 6" | = | 15cm |
| 7" | = | 18cm |
| 24" | = | 60cm |
| 55" | = | 140cm |
| 103" | = | 260cm |

As an aid to correlating the terms of the claims to the exemplary drawing, the following catalog of elements is provided:

| | | | | |
|---|---|---|---|---|
| 10 | tractor | | 30 | back member |
| 12 | frame | | 32 | strut |
| 14 | V-shaped frame member | | 34 | apex shank |
| 16 | apex | | 36 | knife edge |
| 18 | hitch beam | | 38 | wing shank |
| 20 | struts | | 40 | blade |
| 22 | arm | | 42 | moldboard |
| 26 | arm | | 44 | apex |
| 28 | horn | | 46 | plowshare |

The embodiment shown and described above is only exemplary. We do not claim to have invented all the parts, elements or steps described. Various modifications can be made in the construction, material, arrangement, and operation, and still be within the scope of our invention. The limits of the invention and the bounds of the patent protection are measured by and defined in the following claims. The restrictive description and drawing of the specific example above do not point out what an infringement of this patent would be, but are to enable the reader to make and use the invention.

We claim as our invention:

1. A turnrow plow adapted to be drawn by a farm tractor comprising:
   a. a rigid frame,
   b. a three-point hitch rigidly attached on the frame for attaching the frame to the tractor,
   c. a V-shaped blade having
      (i) two wings attached at
      (ii) a forward apex,
   d. an apex shank fixed to the frame and welded to the blade at the apex,
   e. two wing shanks each fixed to the frame and to an end of the wings
   f. each of the three shanks having a forward edge,
   g. a knife edge on each of the forward edges,
   h. said wings having
      (i) a plow angle of about 12°,
      (ii) a drag angle of about 25°,
   j. said frame including a V-shaped frame member vertically over the V-shaped blade with a forward apex of the frame,
   k. a back member connecting the rear of the V-shaped frame member, forming a triangle,
   m. a hitch beam parallel to the back member and normal to the direction of draft attached to the apex of the V-shaped frame member,
   n. the hitch beam attached by welded joint to the apex and attached by struts extending aligned with the direction of draft from each end of the hitch beam to the V-shaped member, and
   o. three connection points attached to said hitch beam thus forming said three-point connection.

2. The invention as defined in claim 1 further comprising:
   p. each wing includes
      (i) a moldboard extending from the front shank to wing shank,
      (ii) the moldboard having the same width as the shank, and
      (iii) a plowshare extending along and bolted to the front edge of the moldboard.

3. The invention as defined in claim 2 wherein
   q. said moldboards are attached to each of the shanks by a welded joint and each of the shanks is attached to the frame by a welded joint.

* * * * *